June 23, 1942.   R. A. GOEPFRICH   2,287,238
BRAKE
Filed Nov. 20, 1939   3 Sheets-Sheet 1

INVENTOR.
Rudolph A. Goepfrich
BY
ATTORNEY.

June 23, 1942.  R. A. GOEPFRICH  2,287,238
BRAKE
Filed Nov. 20, 1939  3 Sheets-Sheet 2
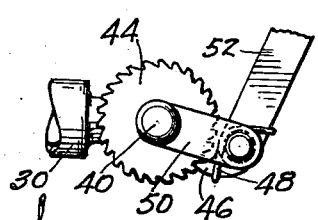
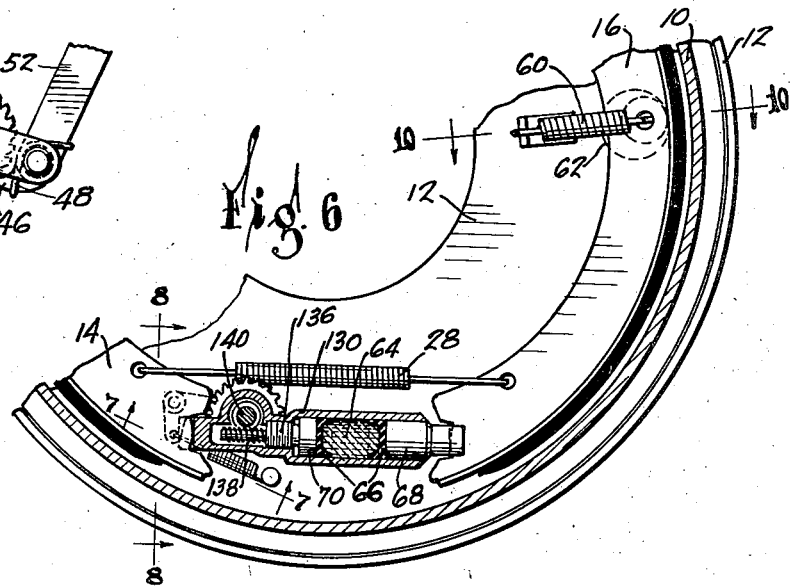
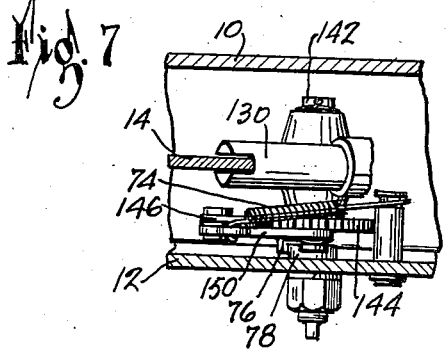
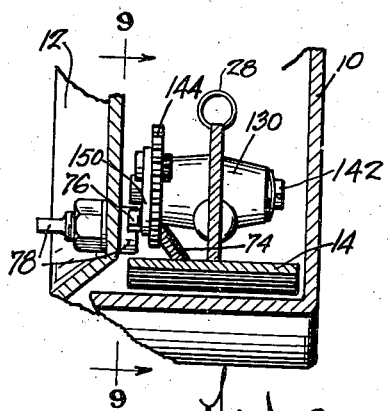
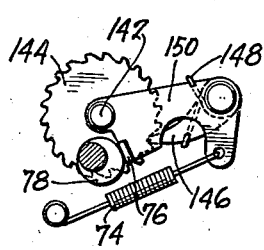
INVENTOR.
Rudolph A. Goepfrich
BY M. W. McConkey
ATTORNEY.

June 23, 1942.   R. A. GOEPFRICH   2,287,238
BRAKE
Filed Nov. 20, 1939   3 Sheets-Sheet 3

INVENTOR.
Rudolph A. Goepfrich
BY
ATTORNEY.

Patented June 23, 1942

2,287,238

UNITED STATES PATENT OFFICE 2,287,238

BRAKE

Rudolph A. Goepfrich, South Bend, Ind., assignor to Bendix Aviation Corporation, South Bend, Ind., a corporation of Delaware Application November 20, 1939, Serial No. 305,270

7 Claims. (Cl. 188—79.5)

This invention relates to brakes, and is illustrated as embodied in internal expanding automobile brakes. An object of the invention is to provide an adjustment for the brake which will not over-adjust if actuated when the drum is highly heated from prolonged braking. Preferably the adjustment is made automatically whenever the braking movement exceeds a predetermined amount.

An important feature of the invention relates to avoiding over-adjustment by embodying, in the connecting and adjusting means between the shoes, a body of mercury which expands as the temperature rises, to increase the effective length of the connecting means to compensate for expansion of the brake drum due to the heat.

Other objects and features of the invention will be apparent from the following description of the illustrative embodiment shown in the accompanying drawings, in which:

Figure 1 is a vertical section through one of the described brakes, just inside the head of the brake drum;

Figures 2, 3 and 4 are partial sections respectively on the lines 2—2, 3—3 and 4—4 of Figures 1 and 3;

Figure 6 is a section corresponding to the lower part of Figure 1, but showing a different modification;

Figure 1:
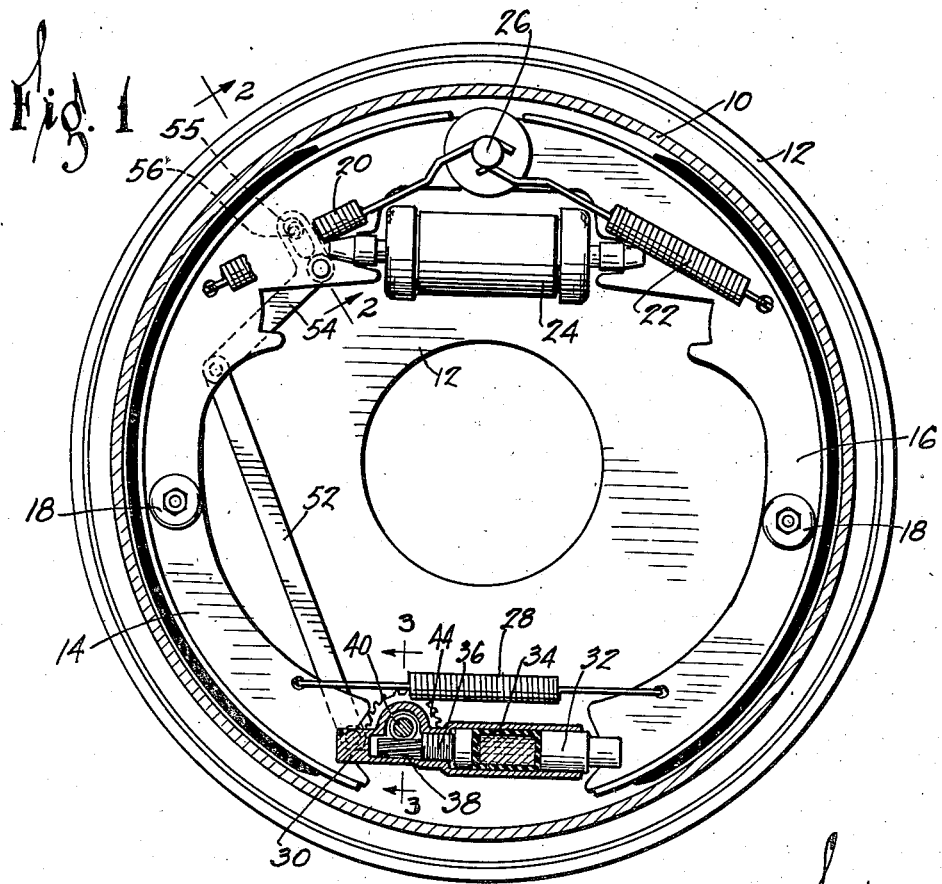
Figure 2:
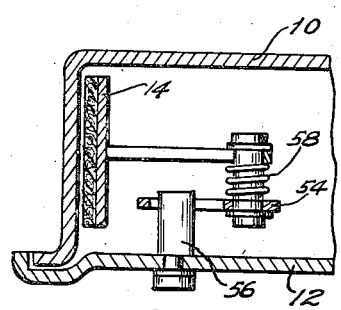
Figure 3:
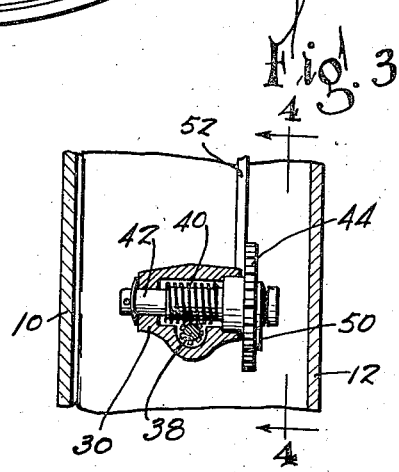
Figure 10:
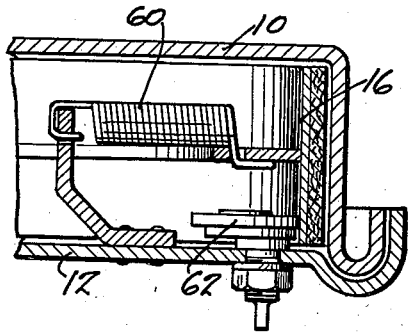
Figure 11:
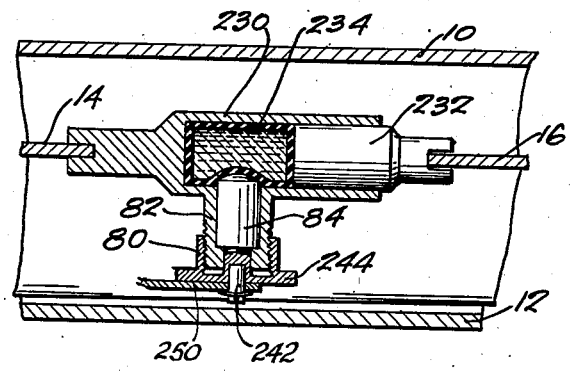
Figure 5:
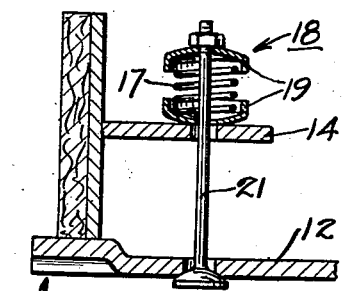
Figure 5 is a detailed view, partly in section, of one of the steady rests shown in Figure 1.
Figure 12:
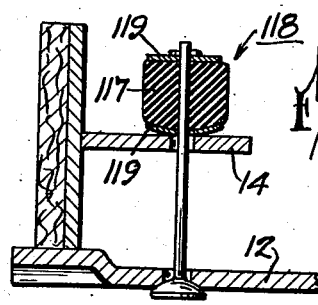

Figures 7, 8, 9 and 10 are partial sections respectively on the lines 7—7, 8—8, 9—9 and 10—10 of Figures 6 and 8;

Figure 11 is a partial section showing a connecting device which may be substituted for the one shown in Figure 1; and Figure 12 is a view corresponding to Figure 5 but showing a modification of the steady rest which may be substituted therefor.

The brake shown in Figures 1-5 includes a rotatable drum 10, at the open side of which is a support such as a backing plate 12. Within the drum are brake shoes 14 and 16, provided with suitable steady rests 18, and which are spread apart, against the resistance of return springs 20 and 22, by applying means such as a wheel cylinder hydraulic device 24. One or the other of the shoes, according to the direction of drum rotation, anchors on an anchor post 26.

The lower ends of the shoes are held by a tensioned spring 28 in notches formed in the ends of a casing member 30 and a plunger 32 which form parts of a novel extensible connecting device which is adapted to be operated to spread the shoes apart to compensate for wear. The casing member 30 is formed at the end opposite its notched end as a cylinder slidably receiving the plunger 32.

Casing member 30 contains a rubber sack or the like 34, filled with mercury, which is confined between the plunger 32 and the head of an adjusting screw 36 threaded adjustably into the casing member. The adjusting screw 36 has a stem 38 formed with inclined splines meshing with a transverse worm 40 on a rotatable member 42 (Figure 3) having a ratchet wheel 44 at its end.

The ratchet wheel 44 is engaged by a pawl 46 (Figure 4) held yieldingly against its teeth by a spring 48, and which is pivoted on an arm 50 which is fulcrumed on the member 42. The arm 50 is connected by a link 52 with the longer arm of a bell-crank lever 54 pivoted on the upper end of the shoe 14. The shorter arm of the lever 54 has a slot 55 therein which causes the shorter arm of the lever to be engaged and held by an adjustable eccentric stop 56 mounted on the backing plate, thereby rocking the lever against the resistance of the brake return spring 20.

The steady rests 18, better shown in Figure 5, resiliently maintain the shoes 14 and 16 in sliding contact with the backing plate 12 by means of springs 17 confined between arcuate faced cup washers 19 mounted upon one end of spherical ended rods 21 passing through the backing plate and shoe webs.

In operation, if the brake lining has worn enough to correspond to one tooth of the ratchet wheel 44, when the brake is next applied the bellcrank lever 54 will engage and be held by the stop 56, applying tension to the link 52 to raise the arm 50 to cause the pawl 46 to engage the next tooth of the ratchet 44.

When the brake is released, spring 20 acts on shoe 14 to return the shoe to released position. Since the slot 55 acts to hold the lever 54 against the stop 56, movement of the shoe 14 to released position causes movement of the lever pivot and swings the long arm of the lever to force the link 52 downwardly to turn the ratchet 44 one tooth, thereby advancing the threaded plunger 36 in the casing member 30, thus shifting sack 34 and plunger 32 toward the shoe 16. An antirattle spring 58 may be provided for the lever 54. To prevent over-adjustment of the brake owing to reverse application, the slot 55 in lever 54 extends along the imaginary circumference of a circle centered at the anchor 26. Also a slight clearance is allowed between the stop 56 and the sides of the slot 55. Thus, when the brake is applied in reverse no force is exerted tending to operate the automatic adjustment mechanism.

An adjustment of the type described above, if no further special provision is made, will not only be operated by lining wear, but also by expansion of the brake drum when heated by prolonged braking. In the arrangement I have provided, however, this does not happen, as heat from the expanded drum causes expansion of the mercury in the sack 34 to increase the effective length of the novel connecting device, to compensate for the drum expansion. Therefore adjustment takes place only to compensate for lining wear.

In the embodiment of Figures 6-10, shoe 16 is provided with an auxiliary return spring 60, holding it when released against an adjustable eccentric stop 62. The lower ends of the shoes are connected by a device including a body 64 of mercury confined between packing cups 66 on the heads of plungers 68 and 70.

Plunger 68 is notched to engage the end of shoe 16, and the two plungers are mounted in a cylinder formed in a connecting member 130 which is notched at its end to engage shoe 14. The plunger 70 is threaded at 136 adjustably into the cylinder member 130, and has a stem 138 formed with worm teeth meshing with a worm 140 on a transverse member 142 provided with a ratchet wheel 144.

An arm 150 mounted on the member 142 is provided with a pawl 146 held by a spring 148 against the ratchet 144. A spring 74 urges the arm 150 in a direction to cause a stop 76 carried thereby to engage an eccentric adjustable stop 78 mounted on the backing plate.

In the operation of this embodiment, the application of the brake causes the arm 150 to be rocked against the resistance of spring 74, it being held by stop 78. When the arm rocks far enough, after excessive wear of the brake lining, the pawl 146 will engage the next tooth of the ratchet 144. Thereupon the spring 74 will cause the adjustment to be made as the brake is released.

In this embodiment the mercury 64 prevents operation of the adjustment when the drum expands due to heat.

In Figure 11, operation of the ratchet 244 in the manner described for ratchet 44 causes the cap 80 carrying the ratchet to be threaded down upon a boss 82 on member 230 to shift a plunger 84 inwardly to compress the sack 254 to force it to elongate to make the desired adjustment. An arm 250, similar to arms 50 and 150 of the other modifications, is pivoted on the ratchet 244 by a pin 242 and serves to actuate the ratchet 244 in a manner in which the elements 50 and 150 operate their associated ratchets.

The steady rest 118 disclosed in Figure 12 is provided with a resilient member 117 preferably of synthetic rubber or the like confined between washers 119, one of which may have an arcuate face to permit rolling motion of the steady rest. The washers 119 are without confining side walls to permit unimpeded outward movement of the resilient member 117 when it is compressed.

While three illustrative embodiments have been described in detail, it is not my intention to limit the scope of the invention to those particular embodiments or otherwise than by the terms of the appended claims.

I claim:

1. A brake comprising a plurality of brake shoes, anchoring and applying means between the ends of the shoes at one side of the brake, and a wear adjustment embodying a shoe connecting device opposite the anchoring and applying means including parts spaced apart by mercury, for increasing the effective length of said device with a substantial rise in temperature, and automatic means for actuating the adjustment when brake-applying movement exceeds a predetermined amount.

2. A device for connecting a plurality of floating brake shoes comprising parts spaced apart by mercury, whereby the effective length of the device is increased as the temperature rises, one of said parts being adjustable to increase the length of said device regardless of the temperature of the mercury.

3. A brake comprising shoes connected at adjacent ends by a device including parts spaced apart by mercury, whereby the connected ends of the shoes are spread apart by a rise of temperature, in combination with means actuated by excessive movement of one of the shoes adjacent its unconnected end and which means operates the connecting device to spread apart the connected ends of the shoes to compensate for wear of the shoes.

4. A brake comprising shoes connected at adjacent ends by a device including parts spaced apart by mercury, whereby the connected ends of the shoes are spread apart by a rise of temperature, in combination with means operating the connecting device to spread apart the connected ends of the shoes to compensate for wear of the shoes, and applying and anchoring means between the unconnected ends of the shoes.

5. A brake comprising a plurality of brake shoes, anchoring and applying means between the ends of the shoes at one side of the brake, and an automatic wear adjustment embodying a shoe connecting device opposite the anchoring and applying means including parts spaced apart by an expansible liquid for increasing effective length of said device with a substantial rise in temperature, and means for actuating the adjustment whenever brake applying movement exceeds a predetermined amount.

6. A brake comprising shoes connected at adjacent ends by a device including parts spaced apart by thermally expansible liquid, whereby the connected ends of the shoes are spread apart by a rise of temperature, in combination with means operating the connecting device to automatically spread apart the connected ends of the shoes to compensate for wear of the shoes, and applying and anchoring means between the unconnected ends of the shoes.

7. A brake comprising a drum, a full floating friction member including two shoes and an adjustable device connecting the shoes, said adjustable device embodying means for increasing its effective length with a substantial rise in temperature, means for automatically actuating the adjustable device to increase its effective length when brake applying movement of the friction member exceeds a predetermined amount, and anchoring and applying means between the ends of the full floating friction member.

RUDOLPH A. GOEPFRICH.